United States Patent [19]

Ikeda et al.

[11] 4,374,885
[45] Feb. 22, 1983

[54] CUSHION MATERIALS AND METHOD OF MAKING SAME

[75] Inventors: Hisashi Ikeda, Yokohama; Yuuichi Hosoda, Hamakita, both of Japan

[73] Assignee: Ikeda Bussan Co., Ltd., Kanagawa, Japan

[21] Appl. No.: 226,315

[22] Filed: Jan. 19, 1981

[30] Foreign Application Priority Data

Jan. 23, 1980 [JP] Japan ............................ 55-7248
Feb. 23, 1980 [JP] Japan ....................... 55-22619[U]
Oct. 1, 1980 [JP] Japan ......................... 55-137443
Dec. 12, 1980 [JP] Japan ......................... 55-175497

[51] Int. Cl.³ ............................................. B32B 3/26
[52] U.S. Cl. ................................ 428/160; 264/321;
428/316.6; 428/317.9; 428/198; 428/308.4
[58] Field of Search ............ 428/310, 315, 160, 316.6, 428/317.9; 264/321

[56] References Cited

U.S. PATENT DOCUMENTS

| | | | |
|---|---|---|---|
| 2,878,153 | 3/1959 | Hackländer | 428/315 |
| 3,285,768 | 11/1966 | Habib | 428/310 |
| 4,037,013 | 7/1977 | Sprague | 428/310 |
| 4,042,751 | 8/1977 | Roth | 428/310 |
| 4,054,706 | 10/1977 | Shapiro | 428/31.5 |

FOREIGN PATENT DOCUMENTS 54-134777  10/1979  Japan ................... 428/310

Primary Examiner—William J. Van Balen
Attorney, Agent, or Firm—Jordan and Hamburg

[57] ABSTRACT

A cushion material and method of making the same, in which a soft polyurethane foam is cut into a slab in a predetermined form; applied to or injected into this polyurethane foam slab at a predetermined portion thereof a bonding agent or forming keeping binder which has a property to be solidified in reaction under certain conditions; said slab is shaped as compressed in a pair of forming dies into a predetermined cubic form, or integrally bonded on a cushion layer constituted by said slab of polyurethane foam another cushion layer made of polyurethane foam chips shaped in a predetermined cubic form by chopping or comminuting soft polyurethane foam scrap into chips, applying a bonding agent to them, and compressing them in a pair of forming dies.

24 Claims, 35 Drawing Figures

CUSHION MATERIALS AND METHOD OF MAKING SAME

BACKGROUND OF THE INVENTION

The present invention relates to cushion materials and method of making the same, and more particularly, to cushion materials made, in predetermined forms, of soft polyurethane foam slab and/or chips, and method of making the same.

Figure 1A:
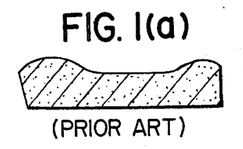
FIGS. 1(a) and (b) are section views of conventional cushion materials, respectively.
Figure 1B:
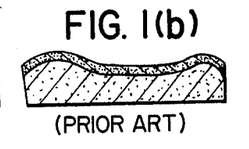

Heretofore, cushion materials for use in automotive seats and home furnitures have been manufactured by using molds of specified shape to expansion-mold a soft polyurethane foam of cellular structure into a predetermined cubic form as shown in FIG. 1(a), or by attaching, as illustrated in FIG. 1(b), a thin polyurethane sheet on the surface profile of a piece already made of soft polyurethane foam as shown in FIG. 1(a). Accordingly, in order to mold cushion materials of different forms, it was necessary to use a special mold and foaming equipment for each of such forms, which resulted in high production costs and wide equipment space. In addition, the prior-art technique needed relatively much labor and time for the manufacture of such cushion products. In the manufacture by expansion molding, occurrence of defects such as protrusions or uneven foaming was unavoidable; also it was necessary to conduct post-treatment like cutting off such protrusions after molding. This also contributed to the high production costs.

The conventional cubic cushion materials include those using rebonded foams by shredding into chips or particles the waste or scrap foam derived from expansion in a mold, applying bonding agent to the chips, and compressing them while curing in reaction with a catalyst or moisture, as disclosed in U.S. Pat. No. 3,114,722; however, these cushion materials are not good in sitting comfort, thus being not suitable for use in automotive seats and quality home furnitures. Furthermore, such cushion material in which polyurethane foam chips or comminuted polyurethane foam particles are bonded and cured by bonding agent is disadvantageous in that the elasticity is not uniform in the whole cushion material and that the foam chips are separated and displaced from each other so that the cushion material is easily deformed.

Further, a method has been also proposed in which a polyurethane foam slab is utilized as cushion material in a seat, the cover of the seat is cubically sewn to make the foam slab comply with cubic form of the seat cover, buttons are provided on the seat cover as needed and pulled down with strings through the foam slab to compress the polyurethane foam slab at said buttons, thereby providing a cushion material in a desired form; compared with a cushion material initially foamed into a cubic form in a mold, however, the above-mentioned cushion material is not good in sitting comfort and durability; also, it is very troublesome to sew and button the seat cover and cushion material for a desired form.

Figure 2:
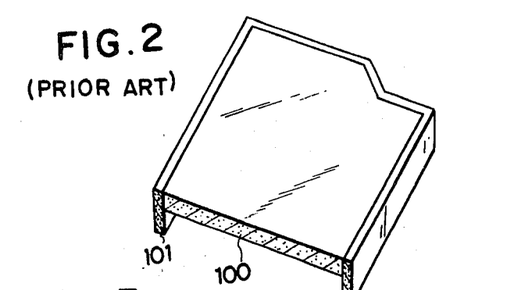
FIG. 2 shows perspectively a conventional cushion material for use in automotive seat.

Conventionally, the cushion material for use in the automotive seat is placed on the frame and spring mechanism forming together the seat. A cushion material like this comprises, as shown in FIG. 2, a main body 100 along the peripheral sides of which a side piece 101 is attached. When the cushion material is placed on said frame and spring mechanism of the seat, the side piece 101 encloses the outer periphery of the frame and spring so as to prevent the cushion material from displacing; however, in this example, the process of attaching the side piece 101 is indispensable but it is troublesome, thus decreasing the efficiency of cushion-material production. The foaming equipment can be so operated as to form the bent piece integrally with the main body without attaching the side piece along the peripheral sides of main body 100; however, in case of producing automotive seat cushion materials, it is necessary to use many shapes of molds for different types of the automobile. The conventional method of making cushion materials is thus disadvantageous also from the standpoint of equipment space in the factory.

SUMMARY OF THE INVENTION

Accordingly, the present invention has a primary object to conquer the drawbacks of the conventional technique in this field, and to provide a cushion material made by using a cheaply commercially-available polyurethane foam slab and shaping it simply and consequently with a low cost, and which represents a sitting comfort and durability comparable to those of a cushion material which is initially produced by the technique of expansion molding.

The present invention has another object to provide a method of making a cushion material of a polyurethane foam slab which is cheaply available, by shaping the foam slab in a easy, low-cost and rapid manner and into a desired cubic form which can be positively maintained.

The present invention has a still another object to provide a cushion material in which a first cushion layer made of a soft polyurethane foam slab shaped in a predetermined cubic form is laid over, joined and formed integrally with a second cushion layer made of polyurethane foam chips obtained from soft polyurethane foam scrap by bonding them by a bonding agent and shaping it cubically as predetermined, said first cushion layer covering said second cushion layer.

The present invention has a yet another object to provide a method of making a cushion material by shaping a cheaply-available polyurethane foam slab into a predetermined cubic form to produce a first cushion layer, bonding polyurethane foam chips containing soft polyurethane foam waste and scrap together by means of a bonding agent, shaping it into a predetermined cubic form to produce a second cushion layer, and laying and bonding said first cushion layer onto said second cushion layer integrally with each other so as to cover said second layer.

According to the first aspect of the present invention, since there is produced in a cheaply commercially-available polyurethane foam slab a form keeping layer resulted from solidification of bonding agent or form keeping binder to keep a specified cubic form, it is possible to manufacture cushion materials easily and inexpensively, and the cushion materials thus made represent a good sitting comfort and high durability. By producing said form keeping layer in the polyurethane foam slab, or by laying plural polyurethane foam slabs over each other and creating the form keeping layer between the polyurethane foam slabs thus overlaid, it is possible to avoid spoiling surface feel of the cushion material. Further, in case of a cushion material composed of a base member on which a polyurethane foam slab is laid, a form keeping layer is formed between the base material and the slab, and it is possible to protect the cushion material from the spring mechanism provided in a seat and to better keep the form of the entire cushion material.

According to the second aspect of the present invention, a form keeping layer consisting of bonding agent or form keeping binder is created in a polyurethane foam slab to shape a cushion material, while the bonding agent or form keeping binder is applied to or injected into the periphery of the cushion material, said periphery being bent downward, thus forming a bend which is fixed with the solidified form keeping layer; in this way, the bend or bent piece can be formed integrally with the main body of cushion material. Further, the cushion material can be installed to the seat in such a manner that the bend will enclose the outer periphery of the seat frame to prevent the cushion material from displacing. The bend can be formed simultaneously with the cushion material in one process. Accordingly, an economy of manufacture can be attained and also the bent portion along the periphery of the seat can be made as round as those manufactured by expansion molding.

Furthermore, in case where a bonding agent is applied to the outer surface or injected into the polyurethane foam slab, increasing or decreasing partially or wholly the amount of bonding agent to be applied or injected permits to change partially or wholly the hardness of the cushion material, thus providing a cushion material with much better sitting comfort. In this manner, the partial change in hardness of the cushion material can be more easily and inexpensively attained than the conventional stuffing technique. This aspect of the present invention is very suitable for line production of such cushion materials.

Further, according to the third aspect of the present invention, a method of making a cushion material is proposed which comprising the steps of cutting a polyurethane foam slab made of a cheaply commercially-available soft polyurethane foam into a desired form, applying to or injecting into specified portions of said polyurethane slab a bonding agent which has a property to be solidified in reaction under certain conditions, compressing the slab in a pair of forming dies and solidifying the bonding agent. Since the slab is shaped into a predetermined cubic form complying with the inner shape of the dies, it is easy and rapid to process the foam slab; also in this method, inexpensive dies may be used. Therefore, a method of making a cushion material can be established by which the cost of production is largely reduced.

In a method of making a cushion material which is made of a polyurethane foam slab in which cuts are formed, form keeping layers of bonding agent being formed in the cuts, the steps of forming the cuts, applying the bonding agent and cutting the slab into a desired form can be serially conducted, thus improving considerably the efficiency of production.

According to the fourth aspect of the present invention, a cushion material can be provided which is inexpensive since a cheaply-available polyurethane foam slab and polyurethane foam chips made of soft polyurethane foam waste or scrap are utilized; further, a first cushion layer formed of polyurethane foam slab is laid over, bonded onto and molded integrally with a second cushion layer consisting of polyurethane foam chips, thus providing an improved surface feel, uniform elasticity, and permitting to better keep the shape of the cushion material so that the foam chips will not be separated and displaced from each other.

According to the further aspect of the present invention, a cushion material is produced which is made of a first and second cushion layers by applying a bonding agent to cheaply commercially-available polyurethane foam slab and chips and forming them into an integral structure; thus, no foaming equipment is necessary, the forming dies used may be of a simple structure, and it is possible to produce such cushion materials easily, rapidly and inexpensively.

BRIEF DESCRIPTION OF THE DRAWINGS

Other objects, features, advantages and constructions of the present invention will become apparent from the ensuing description made by way of illustration with reference to the accompanying drawings, in which:

FIGS. 7(a) and (b) show the third embodiment of cushion material according to the present invention, FIG. 7(a) being a perspective view thereof, while

FIGS. 8(a) and (b) show the fourth embodiment of cushion material, FIG. 8(a) being a sectional view of the entire cushion material, while

DESCRIPTION OF THE PREFERRED EMBODIMENTS

Figure 3:
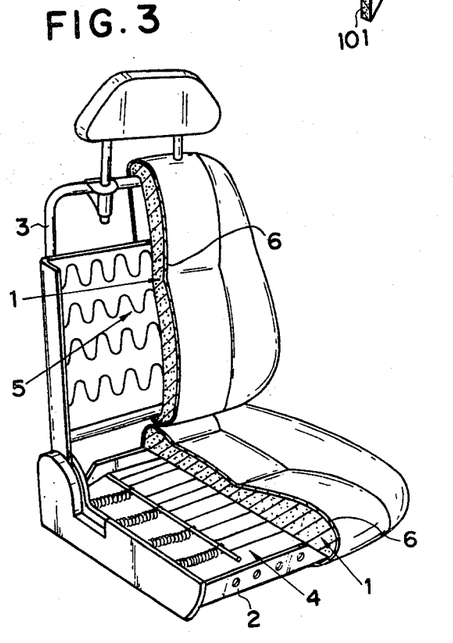
FIG. 3 is a perspective, partially sectional, view of a seat in which a cushion material according to the present invention is used.

Referring to FIG. 3, a cushion material 1 according to the present invention is shown used in an automotive seat. The cushion material 1 is attached to seat frames 2 and 3 as well as to spring mechanisms 4 and 5 installed to the seat frames 2 and 3, respectively. The above-mentioned arrangement is entirely enclosed in a cover 6. The cushion material 1 consists, as shown in the partial sectional view, in enlarged scale, in FIG. 4, of a cushion member 1a made of a soft polyurethane foam and a form keeping layer of bonding agent 7 formed over the cushion member 1a; furthermore, a cover 6 is attached over the form keeping layer 7. Said cushion member 1a is made of a polyurethane foam slab 11 formed by a soft polyurethane foam of cellular structure cut into a predetermined form as shown in FIG. 5(a), said slab 11 being applied with a bonding agent or form keeping binder 12 and compressed into a predetermined cubic form which meets the cubic form of the seat shown in FIG. 3. Said form keeping layer 7 is produced by applying to said polyurethane foam slab 11 as shown in FIG. 5(a) a bonding agent 12 made of an urethane prepolymer containing 1 to 20% of free isocyanate (NCO) synthesized from polyether glycol (diol and triol) and tolylenediisocyanate or a bonding agent 12 made of polyether gylcol and diphenylmethanediisocyanate, compressing the slab 11 into a predetermined cubic form while solidifying said bonding agent 12 so that said polyurethane foam slab 11 is maintained or kept in said specified cubic form.

Figure 4:
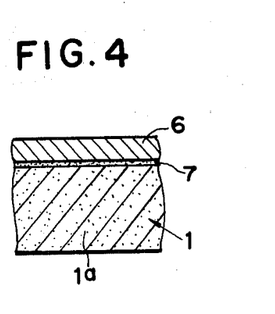
FIG. 4 is a partial sectional view, in enlarged scale, of the first embodiment of cushion material used in the seat shown in FIG. 3.
Figure 5A:
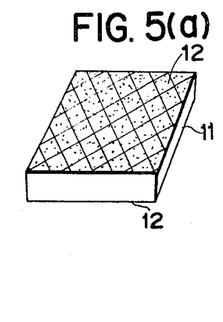
FIGS. 5(a), (b) and (c) are illustrative of the steps or processes, respectively, of manufacturing the cushion material used in the seat in FIG. 3.
Figure 5B:
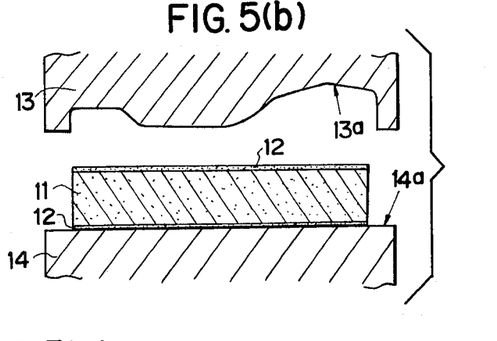
Figure 5C:
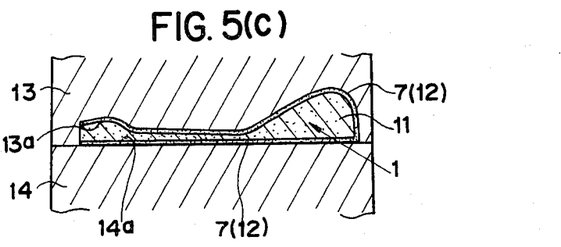

The process of manufacturing such cushion material 1 shown in FIGS. 3 and 4 will be illustrated in more details with reference to FIGS. 5(a) to (c). FIG. 5(a) shows the polyurethane foam slab 11 cut in a predetermined form, of which the front and rear faces are applied with the bonding agent 12. The polyurethane foam slab 11 thus applied with the bonding agent 12 is inserted in between a pair of forming dies 13 and 14 shown in FIG. 5(b), then compressed between the dies 13 and 14 by lowering the cylinder, for example, while solidifying the bonding agent 12 to create the form keeping layer 7. Thus, the slab 11 is shaped into a cubic form along the die faces 13a and 14a of the dies 13 and 14, respectively. Thereafter, the loading of the dies 13 and 14 is released to take out the shaped polyurethane foam slab 11. The form keeping layer 7 thus produced along the periphery of the slab 11 will prevent the latter from returning to its initial form; thus a cushion material 1 of which the predetermined cubic form is maintained or kept is obtained. Since the form keeping layer 7 thus produced has a rubber-like elasticity, the cushion material 1 becomes an elastic polyurethane foam piece having the properties of rubber in addition to those of polyurethane foam; it represents an extremely small compression set and a great tearing strength. Thus, the cushion material 1 according to the present invention is optimum for use as cushion material.

In the above, the case in which a urethane prepolymer produced from polyether glycol and tolylenediisocyanate, and containing 1 to 20% of free icocyanate is used as the bonding agent 12 in the process of manufacturing the cushion material 1 has been described; however, in case where a polyurethane foam slab 11 of 50 mm in thickness was used, the above-mentioned bonding agent 12 was sprayed at a rate of 200 g/m$^2$ to both the front and rear faces of said slab 11, this slab 11 was compressed in steel, resin or wooden dies, and then water or steam was injected into the slab 11 to cure the bonding agent 12 in reaction with such water content. In this way, a quality cushion material of a predetermined cubic form was obtained. The amount of this bonding agent 12 to be applied varies depending upon the thickness and specific gravity of the polyurethane foam slab 11 used, and the bonding agent 12 is not always evenly applied to the surfaces of the slab 11 (naturally, portions of larger bending angles should be applied with a larger amount of the bonding agent 12 than other portions). Accordingly, it is not possible to determine the amount of bonding agent to be applied in digital form; for a measure, however, an amount of about 100 g/m$^2$ to 500 g/m$^2$ is suitable for a polyurethane foam slab of about 50 mm in thickness. It is to be understood that for curing certain portions of a shaped cushion material 1, the portions may be applied with a larger amount of the bonding agent than to the other portions, or the faces 13a and 14a of the dies 13 and 14 may be so set that the polyurethane foam slab 11 is more heavily compressed at said certain portions than at the other portions. Combination of the adjustment in amount of bonding agent and the adjustment of compressing force may be employed for that purpose.

Furthermore in case where the above-mentioned bonding agent of said composition is used, 50 to 150 parts by weight of a solvent such as hydrocarbon halide is added to 100 parts by weight of urethane prepolymer (of a viscosity of 4500 centipoises at 25° C.) containing 7% of free isocyanate and the latter is agitated to reduce its viscosity; the polyurethane foam slab 11 is applied with this bonding agent of this decreased viscosity by spraying, then inserted in between the dies and compressed between them. After that, the urethane prepolymer in the bonding agent is made to react with water; in this case, for a reduced time of water application and reaction at a higher reaction temperature, a steam of 0.4 to 8.0 kg/cm$^2$ in pressure is injected into the slab 11 to cure the urethane prepolymer in reaction with the water, thus producing the form keeping layer 7. Since this form keeping layer 7 has an elasticity like rubber, the cushion material 1 thus made will represent polyurethane foam's properties as well as rubber's ones, and curings resulted from the reaction of the urethane prepolymer with OH group permit to minimize the compression set and repeated compression set, and to provide a great tearing strength, of the cushion material 1 thus produced; this cushion material is optimum for use as cushion material.

Furthermore, the bonding agent 12 may be a thermoplastic or thermosetting resin such as polyethylene powder or hot-melt adhesive, or any other various types of adhesive.

For example, in case where an adhesive containing a thermoplastic resin is used as bonding agent, a polyurethane foam slab 11 applied with said bonding agent 12 is inserted in between the molds 13 and 14, simultaneously compressed and heated to fuse and soften the bonding agent 12; when the slab 11 is cooled thereafter, the bonding agent 12 is solidified in the form compressed between the molds 13 and 14, thus creating a form keeping layer 7 in the polyurethane foam slab 11. Even when the loading of the forming dies 13 and 14 is released and the slab 11 is taken out, the latter is prevented by the form keeping layer 7 from returning to its initial form. In this way, a cushion material 1 is produced which is kept or maintained in the predetermined cubic form.

Figure 6:
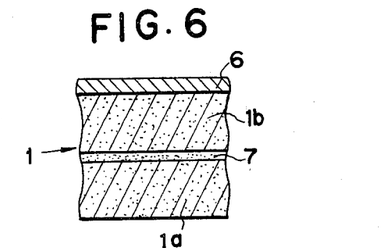
FIG. 6 is a partial sectional view, in enlarged scale, of the second embodiment of cushion material used in the seat in FIG. 3.

FIG. 6 shows the second embodiment of cushion material 1 for use in the automotive seat shown in FIG. 3; this cushion material 1 is composed of a lower cushion layer 1a and upper cushion layer 1b, and a form keeping layer 7 produced between these cushion layers 1a and 1b. Further, a cover 6 is attached over the upper cushion layer 1b. Both said lower and upper cushion layers 1a and 1b form together a cushion material 1 in which a pair of upper and lower polyurethane foam slabs cut in a predetermined form is used as shown in FIG. 4, a bonding agent is applied to between said upper and lower slabs, the latter are compressed between the molds as shown in FIG. 5 while the bonding agent is solidified to produce a form keeping layer 7 between said upper and lower polyurethane foam slabs, said cushion material 1 thus keeping its predetermined cubic form. Creation of the form keeping agent 7 between the upper and lower cushion layers made of polyurethane foam slab is advantageous in that even use of a relatively great amount of bonding agent will not result in the surface of cushion material 1 of firmer feel than necessary but permit to maintain a feel of the soft polyurethane foam and further to assure the shaping in the cubic form as well as to positively keep that cubic form. Thus, it is possible to cubically shape a relatively thick polyurethane foam slab.

It should be noted that both the first embodiment shown in FIG. 4 and the second embodiment shown in FIG. 6 may be simultaneously applied to the manufacture of a cushion material, namely, while the form keeping layer is produced between the upper and lower cushion layers 1b and 1a in pair, a form keeping layer may be created also over the front face of the upper cushion layer 1b, thus producing a cushion material keeping itself in a predetermined cubic form.

Figure 7A:
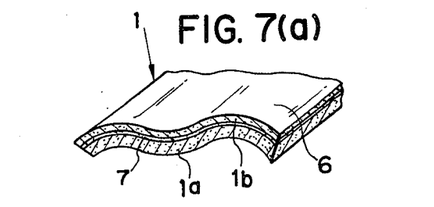
Figure 7B:
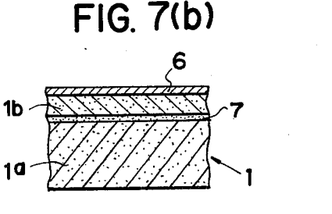
FIG. 7(b) is a partial sectional view, in enlarged scale, thereof.

FIGS. 7(a) and (b) show the third embodiment of cushion material 1 for use in the seat shown in FIG. 3, FIG. 7(b) being a partial sectional view, in enlarged scale, of the embodiment. In this Figure, the cushion material 1 is similar to the cushion material 1 shown in FIG. 6 except that the upper cushion layer 1b is made of a polyurethane foam slab of a relatively small thickness, like 5 to 10 mm. The cushion material 1 in this third embodiment in FIG. 7 can be shaped into a predetermined cubic form and kept in that form with a relatively small amount used of bonding agent as compared with the cushion material 1 shown in FIG. 6, and can keep the surface feel of soft polyurethane foam.

Figure 8A:
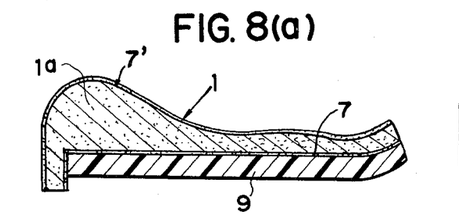
Figure 8B:
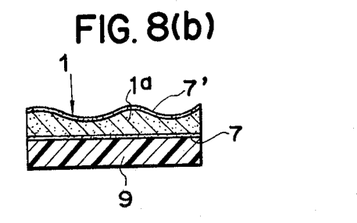
FIG. 8(b) is a partial sectional view, in enlarged scale, thereof.

FIGS. 8(a) and (b) show the fourth embodiment of cushion material 1 for use in the seat shown in FIG. 3, FIG. 8(b) being a partial sectional view, in enlarged scale, of this embodiment; the cushion material 1 in this embodiment is produced by applying a bonding agent on the rear face of a polyurethane foam slab cut in a predetermined form, attaching a base member 9 such as a plate formed by unwoven cloth or vegetable fiber, further applying the bonding agent also on the front face of said polyurethane foam slab, and compressing the slab between the forming dies as shown in FIG. 5 while solidifying the bonding agent layers. Thus, the cushion material 1 is composed of a cushion member 1a made of said polyurethane foam slab, the base member 9, an intermediate form keeping layer 7 produced from solidified bonding agent between said cushion member 1a and base member 9, and an upper form keeping layer 7' formed by the solidified bonding agent on the front face of said cushion member 1a. In case of such a cushion material in which the cushion member 1a made of polyurethane foam slab has attached on the rear face thereof a base member 9, the base member 9 prevents the cushion member 1a from being directly damaged by the spring mechanisms 4 and 5 shown in FIG. 3 and serves to keep the entire form of the cushion material 1. It is to be understood that the base member 9 shown in FIG. 8 and the upper cushion layer 1b shown in FIG. 7 may be made of any other proper material than previously described.

Figure 9:
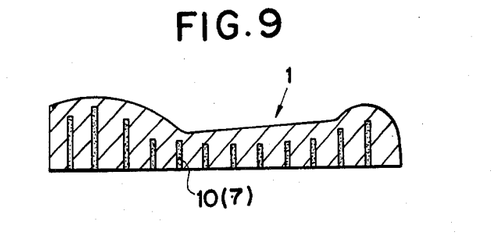
FIG. 9 is a sectional view of the fifth embodiment of cushion material according to the present invention.

FIG. 9 shows the fifth embodiment of cushion material 1 for use in the seat previously illustrated. In this case, the cushion material 1 is made of a polyurethane foam slab 11 of which the rear face has formed therein a plurality of cuts 10 in which the bonding agent is applied or injected, said bonding agent is solidified to be a form keeping layer 7. In this embodiment, the cuts 10 are formed upward in the polyurethane foam-slab rear face, but they may be formed downward in the front face of the slab or alternately in both the rear the front faces. Further, the length of the individual cuts may be changed depending upon the thickness of a cushion material 1 to be produced. The cushion material 1 having form keeping layers 7 formed in the cuts 10 can be well shaped in a cubic form and maintain an unspoiled surface feel.

Figure 10A:
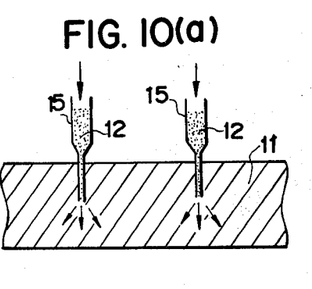
FIGS. 10(a) and (b) are sectional views, respectively, showing the example method of injecting the bonding agent, this step being included in the processes of manufacturing the cushion material used in the seat shown in FIG. 3.

FIG. 10(a) shows the method of injecting the bonding agent 12 into the polyurethane foam slab 11. In this method, a syringe 15 is used instead of applying the bonding agent to the surface of the slab as shown in FIGS. 4 thru 8 or applying or injecting it into the cuts formed in the slab as shown in FIG. 9. The syringe 15 is introduced into the polyurethane foam slab 11 to inject the bonding agent 12 through the syringe to desired regions within the slab 11.

Figure 10B:
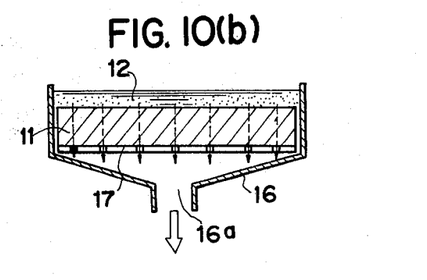

FIG. 10(b) shows the use of a funnel-shaped casing 16 in place of the injecting method shown in FIG. 10(a); a porous plate 17 is placed within the casing 16, a polyurethane foam slab 11 is put on the porous plate 17, then a bonding agent 12 is poured into the casing 16, and the bonding agent 12 is sucked in vacuum state from the outlet 16a of the casing 16, thus the agent 12 being injected into the polyurethane foam slab 11. This method facilitates injection of the bonding agent 12 nearly uniformly to the entire polyurethane foam slab 11.

Figure 11:
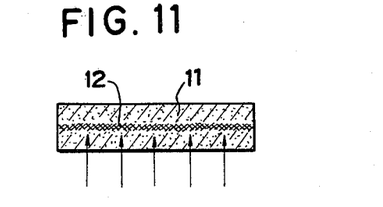
FIG. 11 is a sectional view of a polyurethane foam slab in which the bonding agent is injected.

FIG. 11 is a sectional view, by way of example, of a polyurethane foam slab 11 in which the bonding agent 12 is injected by the methods shown in FIGS. 10(a), (b) or other method. Also in this case where the bonding agent 12 is injected into the polyurethane foam slab 11 and solidified therein, the polyurethane foam slab 11 as cushion material keeps the surface feel of the polyurethane foam, and permits use of a relatively large amount of bonding agent 12; even in such case, the surface of the cushion material is prevented from being hardened by the bonding agent to such extent that it feels like a rubber, and even a relatively thick polyurethane foam slab 11 can be shaped into a predetermined cubic form.

Figure 12:
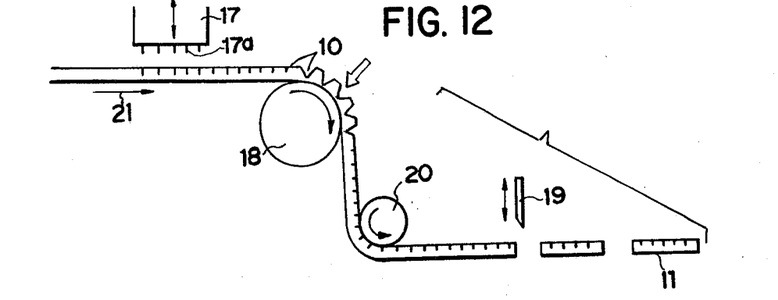
FIG. 12 is schematically illustrative of the steps of forming the cuts into the polyurethane foam slab which comprises the cushion material shown in FIG. 9, and applying the bonding agent into them.
Figure 13:
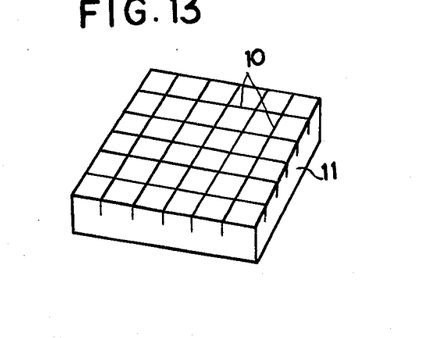
FIG. 13 is a perspective view of a polyurethane foam slab made by the method illustrated in FIG. 12.

FIG. 12 is illustrative of the process of making polyurethane foam slabs 11 with bonding agent 12 applied in the cuts formed in the slab 11 as shown in FIG. 9. In this Figure, it is seen that a polyurethane foam slab 11 in the form of a wide web made of soft polyurethane foam is fed in the direction of arrow 21. While the slab 11 is moving, blades 17a of the cutter 17 are vertically moved to form cuts 10 in the polyurethane foam slab 11. Then, the slab 11 in which the cuts 10 are formed is moved as curved downward by about 90 deg. over a roller 18, thus opening the cuts 10 during this movement; bonding agent 12 is applied into the cuts 10 thus opened. The polyurethane foam slab 11 with bonding agent 12 applied in the cuts 10 is returned by means of another roller 20 to the initial direction of movement. During the movement after passage by the roller 20, the web of slab 11 is cut by a cutter 19 into a predetermined form. The cuts 10 are formed, as shown in FIG. 13, in the polyurethane foam slabs thus produced.

Figure 14A:
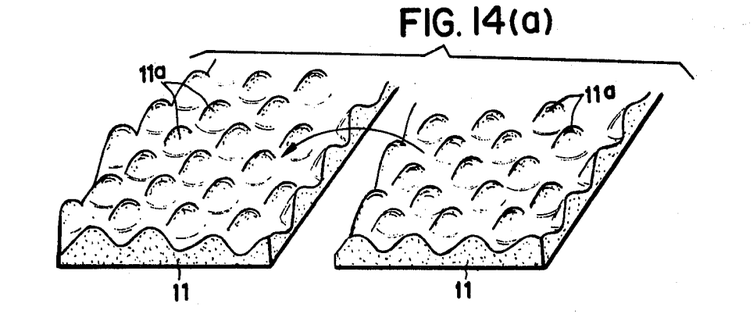
FIGS. 14(a) and (b) are a perspective view of a pair of polyurethane foam slabs of which the cushion material used in the seat shown in FIG. 3 is composed, and a partial sectional view, in enlarged scale, of the sixth embodiment of cushion material formed by this pair of polyurethane foam slabs, respectively.
Figure 14B:
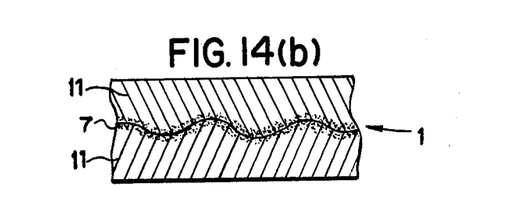

FIGS. 14(a) and (b) shows the sixth embodiment of cushion material 1 for use in the seat previously illustrated. As seen from FIG. 14(a), this cushion material 1 comprises two polyurethane foam slabs 11 of which one face 11a is irregularly formed, namely, so-called profiled; these profiled faces 11a of the slabs are applied with bonding agent 12 and bonded together in opposition to each other, and at the same time, the slabs 11 are comprised in a forming die, thus solidifying the bonding agent 12 to produce the form keeping layer 7. In this way, a cushion material 1 is obtained as shown in FIG. 14(b). According to this embodiment, even the use of a relatively great amount of bonding agent will not spoil the surface feel of polyurethane foam, and permits to well keep the cushion material 1 in the predetermined cubic form.

FIGS. 15 thru 18 show that the conventional side piece which is attached along the peripheral sides of a cushion material for use in an automotive seat as shown in FIG. 2 can be formed integrally and simultaneously with the cushion material by means of the process of manufacturing the cushion material according to the present invention; this manufacturing process will be explained with reference to FIGS. 15 thru 18.

Figure 15:
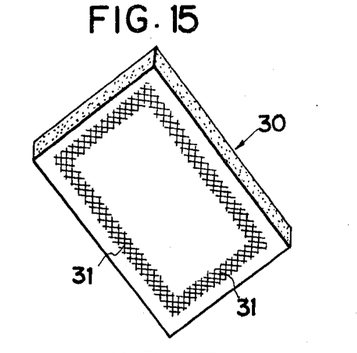
FIG. 15 shows perspectively an example of polyurethane foam slab which forms a cushion material according to the present invention.
Figure 16:
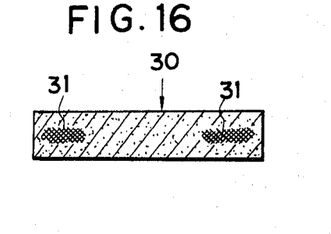
FIG. 16 is a sectional view of another example of polyurethane foam slab which forms a cushion material according to the present invention.
Figure 17:
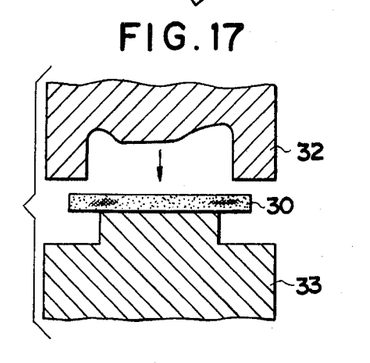
FIGS. 17 and 18 are sectional views, respectively, showing the steps or processes of manufacturing the cushion material according to the present invention.
Figure 18:
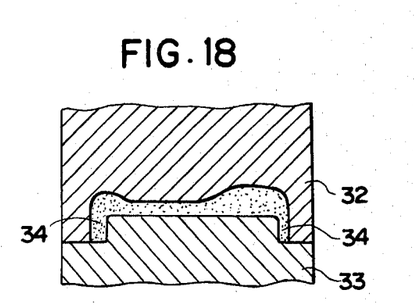

As seen in FIG. 15, the polyurethane foam slab 30 is made of a soft polyurethane foam, and a bonding agent 31 of the same properties as previously mentioned is applied to the front or rear face, or both the faces of the slab along the peripheral area there of near the portions to be bent. Otherwise, the bonding agent 31 may be injected into the slab 30 near said peripheral area as shown in FIG. 16. The polyurethane foam slab 30 is inserted in between a pair of forming dies 32, 33, then compressed between these dies 32 and 33 as shown in FIG. 18, while the bonding agent 31 is solidified, thus bending the peripheral sides of said slab 30 to produce bent pieces or bends 34. Since the bends 34 can be formed simultaneously with the above-described cushion material 1, it is not only possible to produce said bends 34 easily and inexpensively, but also to improve the productivity because the conventional process of attaching the side piece 101 is eliminated.

Figure 19:
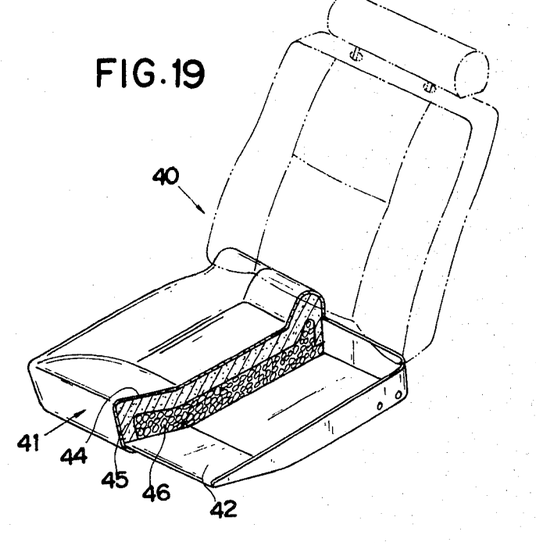
FIG. 19 is a perspective, partially sectional, view of a seat in which the further embodiment of cushion material according to the present invention is utilized.

FIG. 19 is a perspective view of an automotive seat in which a yet another embodiment of cushion material 41 according to the present invention is used. The cushion material 41 is installed to a seat frame 42 integrally made of a plastic, and is totally covered with a cover 44. As shown in the partial sectional view, in enlarged scale, in FIG. 20, the cushion material 41 is composed of a first cushion layer 45 formed by a polyurethane foam slab made of soft polyurethane foam, and a second cushion layer 46 formed by a polyurethane foam chips of soft polyurethane foam, said second cushion layer being integrally bonded to the rear face of said first cushion layer 45. Said first cushion layer 45 is a polyurethane form slab cut in a predetermined form and applied with a bonding agent, and shaped into a cubic form of the cushion material 41 shown in FIG. 19. The second cushion layer 46 integrally bonded to the rear face of said first cushion layer 45 is made of polyurethane foam chips 46a obtained by chopping or comminuting soft polyurethane foam scrap, applying the bonding agent to them and shaping them into a predetermined cubic form. As seen in FIG. 19, the second cushion layer 46 is laid over and integrally bonded with said first cushion layer 45, the latter being laid so as to cover the second cushion layer 46, thus shaping the cushion material 41. The second cushion layer 46 of the cushion material 41 thus shaped can be made of soft polyurethane foam waste or scrap, while the first cushion layer 45 is also made of a cheaply commercially-available polyurethane foam slab; therefore, the cushion material 41 can be produced inexpensively. Further, since the second cushion layer 46 made of polyurethane foam chips 46a is covered by the first cushion layer 45, the form of the cushion material 41 can well maintained so that the chips will not be separated and displaced from each other, and the cushion material 41 has a uniform elasticity, and also a good surface feel and sitting comfort which are comparable with those of cushion material expansion-molded. Further, the cushion material 41 has an improved durability.

Figure 20:
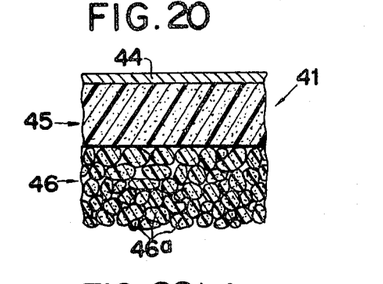
FIG. 20 is a partial sectional view, in enlarged scale, of the cushion material shown in FIG. 19.

Next, the process of manufacturing the cushion material 41 shown in FIGS. 19 and 20 will be described with reference to FIGS. 21 thru 24.

Figure 21:
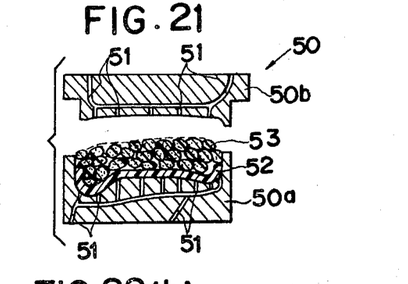
FIGS. 21, 22(a) and (b), 23(a) and (b), and 24(a) and (b) are sectional views showing the steps or processes, respectively, of manufacturing a cushion material according to the present invention.

In FIG. 21, a pair 50 of integral-forming dies consists of a lower die 50a and upper die 50b, each of which is formed with a plurality of steam inlet holes 51. In order to shape the cushion material 41 by using this integral-forming die pair 50, the forming die pair 50 is heated by the steam through the steam inlet holes 51 or directly by the steam. On the other hand, a polyurethane foam slab cut in a predetermined form and made of soft polyurethane foam is prepared and applied with a bonding agent. This polyurethane foam slab 52 is set in the lower die 50a as shown in FIG. 21. For the cushion material 41 for use in the seat 40 shown in FIG. 19, the bonding agent is applied in amount of 100 g/m$^2$, for example. Next, the soft polyurethane foam is chopped or comminuted into chips to which bonding agent in 20% by weight of the weight of chips, for example, is applied previously. The polyurethane foam chips 53 thus applied with the bonding agent are placed on said polyurethane foam slab 52 as shown in FIG. 21. Then, the upper die 50b is lowered until it fits to the lower die 50a. With the die pair 50 fully closed, a small amount of steam is injected through the steam inlet holes 51 into the dies, thus compressing the polyurethane foam slab 52 and polyurethane foam chips 53 for a predetermined time to shape them into a cushion material 41. As the result, said polyurethane foam slab 52 and chips 53 are integrally bonded and formed in compliance with inner shape of the forming die pair 50 to produce the cushion material 41 consisting of the first and second cushion layers 45 and 46 as shown in FIG. 19. Thus, the method of making the cushion material 41 mentioned in the above needs only a single pair of integral-forming dies 50 which may be an inexpensive one, includes less steps of production, and permits to produce the cushion material in a reduced shaping time.

Figure 22A:
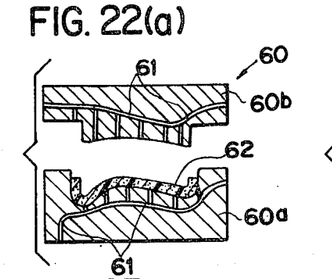
Figure 22B:
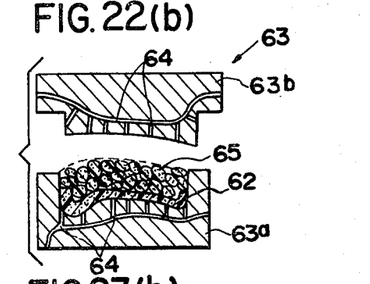

In the method of making the cushion material illustrated in FIGS. 22(a) and (b), a polyurethane foam slab is first shaped into the first cushion layer; then, a second cushion layer made of polyurethane foam chips is formed integrally with said slab mass. As seen in FIG. 22(a), a pair of polyurethane foam slab forming dies 60 consists of a lower die 60a and upper die 60b, each of which is formed with a plurality of steam inlet holes 61 to inject the steam into the dies. To shape the polyurethane foam slab by means of the forming die pair 60, first said forming die pair 60 is heated by the steam through the steam inlet holes or directly by the steam. On the other hand, a polyurethane foam slab cut in a predetermined form and made of a soft polyurethane foam is prepared, and applied with a bonding agent. The polyurethane foam slab 62 is set in the lower die 60a as shown in FIG. 22(a). The amount of the bonding agent to be applied here may be 100 g/m$^2$, for example, similarly to the case shown in FIG. 21. The upper die 60b is lowered until it fits to the lower die 60a. With the forming die pair fully closed, a small amount of steam is injected through said steam inlet holes 61 into the die pair 60. In this state, the polyurethane foam slab 62 is compressed and shaped for a predetermined time, for example, for 2 minutes or so by the forming die assembly 60 to provide a shaped polyurethane foam slab. Next, a pair of integral-forming dies 63 consisting of a lower die 63a and upper die 63b as shown in FIG. 22(b) is prepared, and heated by the steam through the plurality of steam inlet holes 64 formed therein or directly by the steam, and the polyurethane foam slab mass 62 is set in the lower die 63a. Polyurethane foam chips 65 obtained by chopping or comminuting soft polyurethane scrap and applied with a bonding agent in amount of 20% by weight of the weight of the chips, are placed on said polyurethane foam slab mass 62 as shown in FIG. 22(b). Then, the upper die 63b is lowered until it fits to the lower die 63a. With the integral-forming die assembly 63 fully closed, a small amount of steam is injected through said steam inlet holes 64 into the die assembly 63 in which said polyurethane foam chips 65 will be compressed and shaped integrally with said polyurethane foam slab mass 62 for a predetermined time, for example, for 4 minutes. As the result, said polyurethane foam slab 62 and chips 65 are integrally bonded and formed in compliance with the inner shape of said integral-forming die assembly 63, thus providing a cushion material 1 composed of a first cushion layer 45 and second cushion layer 46 as shown in FIG. 19.

Figure 23A:
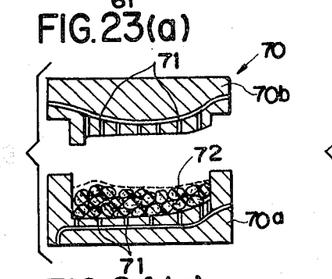
Figure 23B:
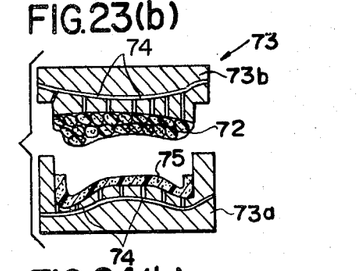

In the process of manufacturing shown in FIGS. 23(a) and (b), first a polyurethane foam chip mass is produced which constitutes the second cushion layer, then the first cushion layer made of polyurethane foam slab is shaped integrally with said chip mass. As seen in FIG. 23(a), a pair 70 of polyurethane foam chip forming dies including a lower die 70a and upper die 70b has formed therethrough a plurality of stream inlet holes 71 to inject the steam into the die pair 70; in order to shape a polyurethane foam chips by means of the forming die pair 70, said die pair 70 is first heated by the steam. On the other hand, soft polyurethane foam scrap is chopped or comminuted into chips which will be applied with a bonding agent in an amount, for example, of 20% of weight of the weight of the chips. These chips are placed in the lower die 70a as shown in FIG. 23(a). The upper die 70b is lowered until it fits to the lower die 70a. With this forming die pair 70 fully closed, a small amount of steam is injected through said steam inlet holes 71 into the die pair 70 in which the polyurethane foam chips 72 are compressed and shaped for a predetermined time, for example, 4 minutes or so, thus producing a polyurethane foam chip mass. Then, a pair of integral-forming dies 73 consisting of a lower die 73a and upper die 73b as shown in FIG. 23(b) is prepared which has formed therethrough a plurality of steam inlet holes 74. The die pair 73 is heated by the steam through said holes 74 or directly by the steam. Polyurethane foam slab cut into a predetermined form and made of soft polyurethane foam, which is applied with a bonding agent, is set in the lower die 73a as illustrated in FIG. 23(b). The amount of the bonding agent to be applied to the polyurethane foam slab 75 may be 100 g/m$^2$, for instance. Next, the polyurethane foam chip mass 72 shaped as shown in FIG. 23(a) is set in the upper die 73b as shown in FIG. 23(b). The upper die 73b is lowered until it fits to the lower die 73a; with the die pair 73 fully closed, a small amount of steam is injected through said steam inlet holes 74 into the die pair in which said polyurethane foam slab 75 is compressed and shaped integrally with said shaped polyurethane foam chip mass 72 for a predetermined time, for example, for 4 minutes or so. Thus, a cushion material 41 composed of the first and second cushion layers 45 and 46 as shown in FIG. 19. The cushion material thus produced by first compressing the polyurethane foam chip mass has a uniform hardness of the second cushion layer made of polyurethane foam chips, and since the influence of shrinkage on the form of the cushion material is eliminated, it is very easy to shape the cushion material into a desired form.

Figure 24A:
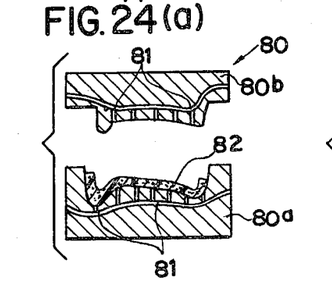
Figure 24B:
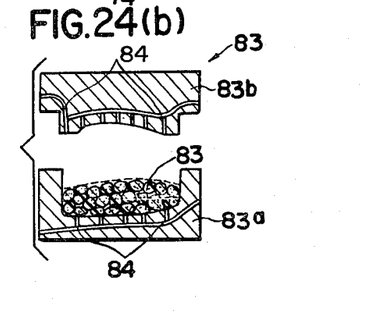

In the process of manufacturing shown in FIGS. 24(a) and (b), a polyurethane foam slab mass constituting the first cushion layer and a polyurethane foam chip mass which form the second cushion layer are produced separately, then both the layers are bonded together to make a cushion material. As seen from FIG. 24(a), the polyurethane foam slab forming die pair 80 is composed of a lower die 80a and upper die 80b each of which has formed therethrough a plurality of steam inlet holes 81 to inject the steam into the die assembly; first, the forming die assembly 80 is heated by the steam. On the other hand, a polyurethane foam slab 82 cut into a predetermined form and made of soft polyurethane foam is prepared, applied with a bonding agent and set in the lower die 80a as illustrated in FIG. 24(a). In this case, the amount of the bonding agent to be applied may be 100 g/m$^2$, for instance. Then, the upper die 80b is lowered until it fits to the lower die 80a. With the die pair 80 fully closed, a small amount of steam is injected through said steam inlet holes 81 into the die pair in which said polyurethane foam slab 82 is compressed for a predetermined time, for example, for 2 minutes or so, to shape a polyurethane foam slab mass 82. Next, a polyurethane foam chip forming die assembly 83 comprising a lower die 83a and upper die 83b as illustrated in FIG. 24(b) is prepared, and heated previously by the steam through the steam inlet holes 84 formed therein or directly by the steam. On the other hand, soft polyurethane foam scrap is chopped or comminuted into chips 85 which are to be applied with a bonding agent in amount of 20% by weight of the weight of the chips. The polyurethane foam chips thus prepared are placed in the lower die 83a as shown in FIG. 24(b), then the upper die 83b is lowered until it fits to the lower die 83a. With the die pair fully closed, a small amount of steam is injected through said steam inlet holes 84 into the die pair 83 in which said polyurethane foam chips 85 are compressed for a predetermined time, for example, for 4 minutes or so, to shape a polyurethane foam chip mass 85. After the polyurethane foam slab mass 82 and polyurethane foam chip mass 85 are prepared separately, both the masses 82 and 85 are bonded together by a bonding agent to produce a cushion material 41 formed by the first and second cushion layers 45 and 46 as illustrated in FIG. 19. Also the cushion material 41 thus produced is featured in that the second cushion layer, namely, the polyurethane foam chip layer is uniformly hard.

As having been described in the foregoing, the present invention provides cushion materials by cutting a polyurethane foam slab made of a cheaply commercially-available soft polyurethane foam into a predetermined form, applying or injecting a bonding agent to or into the slab, compressing it in a pair of simple forming dies in which the bonding agent applied to the slab is solidified to be a form keeping layer, thereby producing a cushion material which holds or keeps itself in a predetermined cubic form; according to the aspects of the present invention, no foaming equipment is necessary, and the forming dies may be of a simple structure. In addition, no defects such as protrusion or uneven foaming found often in the expansion molding occur. Therefore, no post-treatment is required after a predetermined cubic form is given to the cushion material. Say, it is possible to produce cushion materials simply, rapidly and inexpensively.

Furthermore, the sitting comfort or quality of the cushion materials thus produced according to the present invention is comparable to that of cubic cushion materials made by expansion molding technique, and also represents an excellent durability. In addition, by making form keeping layer or layers in the interior of the cushion material or covering the cushion material thus made with a polyurethane foam sheet, the surface feel of the polyurethane foam is maintained, and the previously-mentioned bends or bent portions as well as curves can be formed as rounded. With the technique according to the present invention, the products can be formed similar to those obtained by expansion molding technique, and also are advantageous in said various respects.

Further, by partially changing the application amount of the bonding agent or form keeping binder and by partially changing the compression force of the forming die, the cushion material may be harder in some parts than the rest. More particularly, automotive seat cushion materials can be produced for comfortable sitting with less fatigue for a long time by taking such advantages of the present invention.

Moreover, in case of a cushion material according to the present invention, comprising a first cushion layer made of polyurethane foam slab and a second cushion layer made of polyurethane foam chips, the second layer is covered by the first one so that the cushion material well keeps itself in a predetermined cubic form and represents a uniform hardness. Also in this method of manufacture, no foaming equipment is required, and since inexpensively commercially-available polyurethane foam slab and polyurethane foam waste or scrap are used, the cushion material according to the present invention can be produced inexpensively, simply and rapidly.

The cushion material according to the present invention, comprising two polyurethane foam slab layers attached to each other and shaped in a desired cubic form, is optimally usable in such seats as are required to keep the hardness constant; in case of this product, it is possible to simultaneously attach the two slab layers and shape them into a cubic form, easily and rapidly.

In the foregoing, the present invention has been explained with reference to embodiments of cushion material which are usable to the automotive seats; however, the present invention is not limited to such embodiments, but it is evident that the present invention can be altered or modified variously without departure from the scope of the present invention.

What is claimed is:

1. A cushion material, comprising:
   a plurality of cushion layers formed with a plurality of polyurethane foam slabs in piles cut in a predetermined form,
   form keeping layer means made of bonding agent applied between said plurality of polyurethane foam slabs with its amount partially increased or decreased at a predetermined portion between said polyurethane foam slabs to be solidified in a predetermined cubic form pressure, maintaining said cushion layers in a predetermined cubic form, the surface having a feel of soft polyurethane foam.

2. A cushion material, comprising:
   a first cushion layer obtained by shaping into a predetermined cubic form a polyurethane foam made of a soft polyurethane foam slab cut into a predetermined form;
   a second cushion layer placed upon and integrally bonded with said first cushion layer to be covered by said first cushion layer,
   said second cushion layer obtained by bonding together with a bonding agent, polyurethane foam chips produced by chopping or comminuting soft polyurethane foam scrap, followed by shaping into a predetermined cubic form; and
   form keeping layer means made of bonding agent applied between said first and second cushion layers with its amount partially increased or decreased at a predetermined portion between said polyurethane foam slabs to be solidified in a predetermined cubic form after pressure, maintaining said cushion layers in a predetermined form, the surface having a feel of soft polyurethane foam.

3. A cushion material as set forth in claim 1, said bonding agent being applied to the front or rear, or both the front and rear faces of said polyurethane foam slab and constituting a form keeping layer when solidified.

4. A cushion material as set forth in claim 1, said bonding agent being injected into said polyurethane foam slab and constituting a form keeping layer when solidified.

5. A cushion material as set forth in claim 1, said bonding agent being applied to the outer face of said polyurethane foam slab and also injected thereinto, and constituting a form keeping layer when solidified.

6. A cushion material as set forth in claim 1, said bonding agent being applied to or injected into said polyurethane foam slab at the peripheral portion thereof near an area to be bent along which said polyurethane foam slab is bent and compressed, said bonding agent being solidified at or in said bent portion to constitute a form keeping layer, when solidified, which maintains said bent portion.

7. A cushion material as set forth in claim 1, said bonding agent being solidified with its amount partially increased or decreased at a predetermined portion of said polyurethane foam slab to provide a partial change in solidity of said slab.

8. A cushion material as set forth in claim 1, said bonding agent being applied to between successive two of said stacked polyurethane foam slabs to constitute form keeping layers when solidified.

9. A cushion material as set forth in claim 1, said stacked polyurethane foam slabs including the outermost polyurethane foam slab which is smaller in thickness than the remaining inner polyurethane foam slabs.

10. A cushion material as set forth in claim 1, further comprising a plate-like base member laid on and bonded by means of said form keeping layer of the bonding agent to said polyurethane foam slab.

11. A cushion material as set forth in claim 10, said base member being made of an unwoven cloth or various fibers solidified into the form of a plate.

12. A cushion material as set forth in claim 1, said polyurethane foam slab being composed of a pair of polyurethane foam slabs profiled at the one side thereof, said profiled faces of said polyurethane foam slabs in pair being applied with a bonding agent, bonded together opposite to each other and compressed together at the same time, thus said bonding agent being solidified to constitute a form keeping layer.

13. A cushion material as set forth in any of claims 1, or 2, said bonding agent comprising a urethane prepolymer containing 1 to 20% of free isocyanate (NCO) synthesized from polyether glycol and tolylenediisocyanate.

14. A cushion material as set forth in any of claims 1, or 2, said bonding agent comprising a thermpolastic or thermosetting resin such as polyethylene powder or hot-melt adhesive.

15. The cushion material of claim 3 wherein said bonding agent comprises a urethane prepolymer of 1 to 20% free isocyanate synthesized from polyether glycol and tolylenediisocyanate.

16. The cushion material of claim 3 wherein said bonding agent comprises polyether glycol and diphenylmethanediisocyanate.

17. The cushion material of claim 15 wherein said bonding agent is applied at an amount from about 100 $g/m^2$ to about 500 $g/m^2$.

18. The cushion material of claim 17 wherein steam is additionally injected into said polyurethane foam slab at a pressure of 0.4 to 8.0 $kg/cm^2$ to cure said bonding agent into said form keeping layer.

19. The cushion material of claim 2 wherein said bonding agent in said second cushion layer comprises about 20% by weight of the weight of the polyurethane foam chips.

20. The cushion material of claim 9 wherein said outermost polyurethane layer has a thickness of 5 to 10 mm.

21. The cushion material of claim 1 additionally comprising form keeping layer means of bonding agent internally applied at discrete locations within said polyurethane foam slab.

22. The cushion material of claim 21 wherein a bonding agent is injected into said polyurethane foam slab at discrete locations, to form a form keeping layer at a plurality of locations within said polyurethane foam slab when said bonding agent is solidified.

23. The cushion material of claim 21 wherein a bonding agent is sucked into said polyurethane foam slab at discrete locations, to form a form keeping layer at a plurality of locations within said polyurethane foam slab when said bonding agent is solidified.

24. A cushion material as set forth in claim 21, wherein said bonding agent is internally applied through the front or rear, or both the front and rear faces of said polyurethane foam slab.

* * * * *